United States Patent
Ding et al.

(10) Patent No.: US 11,521,074 B2
(45) Date of Patent: Dec. 6, 2022

(54) FLEXIBLE, LIGHTWEIGHT QUANTIZED DEEP NEURAL NETWORKS

(71) Applicant: Carnegie Mellon University, Pittsburgh, PA (US)

(72) Inventors: Ruizhou Ding, Pittsburgh, PA (US); Zeye Liu, Pittsburgh, PA (US); Ting-Wu Chin, Pittsburgh, PA (US); Diana Marculescu, Pittsburgh, PA (US); Ronald D. Blanton, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 321 days.

(21) Appl. No.: 16/887,988

(22) Filed: May 29, 2020

(65) Prior Publication Data
US 2020/0380371 A1  Dec. 3, 2020

Related U.S. Application Data

(60) Provisional application No. 62/921,121, filed on May 31, 2019.

(51) Int. Cl.
*G06N 3/08* (2006.01)
*G06N 3/04* (2006.01)

(52) U.S. Cl.
CPC .......... *G06N 3/084* (2013.01); *G06N 3/0481* (2013.01); *G06N 3/082* (2013.01)

(58) Field of Classification Search
CPC .......... G06N 3/08; G06N 3/0481; G06N 3/12; G06N 3/084; G06N 3/082; G06N 5/00; G06K 9/6262
See application file for complete search history.

(56) References Cited

U.S. PATENT DOCUMENTS 10,540,591 B2 *  1/2020  Gao ..................... G06N 3/08
10,558,915 B2 *  2/2020  Gao ..................... G16H 70/60
(Continued)

OTHER PUBLICATIONS

Ding, R., et al., "Quantized Deep Neural Networks for Energy Efficient Hardware-based Inference", 2018 23rd Asia and South Pacific Design Automation Conference (ASP-DAC) Jeju, South Korea, Jan. 22-25, 2018, 8 pages.
(Continued)

*Primary Examiner* — Hosuk Song
(74) *Attorney, Agent, or Firm* — KDB Firm PLLC

(57) ABSTRACT

To improve the throughput and energy efficiency of Deep Neural Networks (DNNs) on customized hardware, lightweight neural networks constrain the weights of DNNs to be a limited combination of powers of 2. In such networks, the multiply-accumulate operation can be replaced with a single shift operation, or two shifts and an add operation. To provide even more design flexibility, the k for each convolutional filter can be optimally chosen instead of being fixed for every filter. The present invention formulates the selection of k to be differentiable and describes model training for determining k-based weights on a per-filter basis. The present invention can achieve higher speeds as compared to lightweight NNs with only minimal accuracy degradation, while also achieving higher computational energy efficiency for ASIC implementation.

18 Claims, 4 Drawing Sheets

(56) References Cited

U.S. PATENT DOCUMENTS

| | | | | |
|---|---|---|---|---|
| 11,095,887 B2* | 8/2021 | Kim | ..................... | H04N 19/124 |
| 11,188,817 B2* | 11/2021 | Dikici | .................. | G06N 3/0454 |
| 11,315,016 B2* | 4/2022 | Sundaram | ................ | G06N 3/08 |
| 2020/0380371 A1* | 12/2020 | Ding | .................... | G06N 3/0481 |

OTHER PUBLICATIONS

Ding, R., et al., "LighNN: Filling the Gap between Conventional Deep Neural Networks and Binarized Networks", GLSVLSI 17: Proceedings of the Great Lakes Symposium on VLSI 2017 Banff, Canada, (May 2017) 6 pages.

* cited by examiner

Input: Training dataset $(x, y)$, where $x$ is input and $y$ is label; parameters after the $(p-1)$-th iteration: $w_{p-1}$ (weights), $b_{p-1}$ (biases), and quantization thresholds $t_{p-1}$; quantization function $Q_k(w|t)$; DNN forward computation function $g(x, w, b)$; maximum $k$ value used for all filters; regularization loss coefficients $\lambda$; learning rate $\eta$.

Output: Updated weights $w_p$, biases $b_p$ and thresholds $b_p$.

for *each mini-batch of $x$, $y$* do

1. Quantize weights: $w^q = Q_k(w_{p-1}|t_{p-1})$

2. Forward: compute intermediate results and cross entropy loss function $\mathcal{L}_{CE}$ with $g(\cdot)$, $w^q$, $b_{p-1}$, and mini-batch of $x$; compute regularization loss $\mathcal{L}_{reg,k}$ with $\lambda$ and $w_{p-1}$; get the total loss $\mathcal{L}_{total} = \mathcal{L}_{CE} + \mathcal{L}_{reg,k}$ 3. Backward: compute derivatives $\frac{\partial \mathcal{L}_{total}}{\partial w^q}$, $\frac{\partial \mathcal{L}_{total}}{\partial b_{p-1}}$, and $\frac{\partial \mathcal{L}_{total}}{\partial t_{p-1}}$ 4. Update parameters: $w_p = w_{p-1} - \eta \frac{\partial \mathcal{L}_{total}}{\partial w^q}$; $b_p = b_{p-1} - \eta \frac{\partial \mathcal{L}_{total}}{\partial b_{p-1}}$; $t_p = t_{p-1} - \eta \frac{\partial \mathcal{L}_{total}}{\partial t_{p-1}}$ end

FIG. 4

FLEXIBLE, LIGHTWEIGHT QUANTIZED DEEP NEURAL NETWORKS

RELATED APPLICATIONS

This application claims the benefit of the U.S. Provisional Patent Application No. 62/921,121, filed May 31, 2019, the contents of which are incorporated herein in their entirety.

GOVERNMENT RIGHTS

This invention was made with government support under contract No. 1815899 granted Computing and Communication Foundation of the National Science Foundation. The government has certain rights in this invention.

BACKGROUND OF THE INVENTION

Emerging vision, speech and natural language applications have widely adopted deep learning models that have achieved state-of-the-art accuracy. Recent industrial efforts have focused on implementing the models on mobile devices. However, real-time applications based on these deep models typically incur unacceptably large latencies and can easily drain the battery on energy-limited devices. Therefore, prior research has proposed model compression techniques including pruning and quantization to satisfy the stringent energy and speed requirements of energy-limited devices.

Prior work has extensively explored approaches to reduce latency and energy consumption of Deep Neural Networks (DNNs) on hardware, through both algorithmic and hardware efforts. Because the latency and energy consumption of DNNs generally stem from computational cost and memory accesses, prior work in the algorithmic domain mainly focuses on the reduction of Floating Point Operations (FLOPs) and model size. Some work reduces the number of parameters through weight pruning, while some other work introduces structural sparsity via filter pruning for Convolutional Neural Networks (CNNs) to enable speedup on general hardware platforms incorporating CPUs and GPUs. To reduce the model size, previous work has also conducted neural architecture search with energy constraint. In addition to algorithmic advances, prior art has also proposed methodologies to achieve fast and energy-efficient DNNs. Some prior art works propose the co-design of the hardware platform and the architecture of the neural network running on it. Some work proposes more lightweight DNN units for faster inference on general-purpose hardware, while others propose hardware-friendly DNN computation units to enable energy-efficient implementation on customized hardware.

By reducing the weight and activation precision, DNN quantization has proved to be an effective technique to improve the speed and energy efficiency of DNNs on customized hardware, due to its lower computational cost and fewer memory accesses. A DNN with 16-bit fixed-point representation can achieve competitive accuracy compared to the full-precision network.

Uniform quantization approaches enable fixed-point hardware implementation for DNNs. One prior art effort uses only 1 bit for the DNN parameters, turning multiplications into XNOR operations on customized hardware. However, these models require an over-parameterized model size to maintain a high accuracy.

LightNN is a quantization approach that constrains the weights of DNNs to be a sum of k powers of 2, and therefore can use shift and add operations to replace the multiplications between activations and weights. In LightNN-1, all of the multiplications of the DNNs is replaced by a shift operation, while for LightNN-2, two shifts and an add replace the multiplication operation. Because shift operations are much more lightweight on customized hardware (e.g., Field Programmable Arrays—FPGAs—or Applications Specific Integrated Circuits—ASICs), these approaches can achieve faster speed and lower energy consumption, and generally maintain accuracy for over-parameterized models.

Although the LightNN approaches provide better energy-efficiency, they use a single k value (i.e., the number of shifts per multiplication) across the whole network, and therefore lack the flexibility to provide fine-grained trade-offs between energy and accuracy. The energy efficiency for these models also exhibits gaps, making the Pareto front of accuracy and energy discrete. However, a continuous accuracy and energy/latency trade-off is an important feature for designers to target different market segments (e.g., IoT devices, edge devices, and mobile devices).

SUMMARY OF THE INVENTION

To provide a more flexible Pareto front for the LightNN approaches each convolutional filter in the present invention is equipped with the freedom to use a different number of shift-and-add operations to approximate multiplications. A set of free variables $k=\{k_1, \ldots, k_F\}$ is introduced where each element represents the number of shift-and-add for the corresponding convolutional filter. As a result, a more contiguous Pareto front can be achieved.

For example, if k is constrained such that $k \in \{1, 2\}^F$, then the throughput and energy consumption of the new model will be between the first ($k=\{1\}^F$) and second ($k=\{2\}^F$) versions of the prior art quantization approaches. Formally, $\min_{w,k} \mathcal{L}(w,k)$ is being solved, where $\mathcal{L}$ is the loss function and w is the weights vector. However, the commonly adopted stochastic gradient descent (SGD) algorithm does not apply in this case since $\mathcal{L}$ is non-differentiable with respect to k.

The present invention uses a differentiable training algorithm having flexible k values, which enables end-to-end optimization with standard SGD. Using customized k values for each convolutional filter enables a more continuous Pareto front. The present invention uses an end-to-end differentiable training algorithm via approximate gradient computation for non-differentiable operations and regularization to encourage sparsity. Moreover, the differentiable training approach of the present invention uses gradual quantization, which can achieve higher accuracy than LightNN-1 without increasing latency. The present invention provides a differentiable training algorithm which provides a continuous Pareto front for hardware designers to search for a highly accurate model under the hardware resource constraints, wherein the differentiable training enables gradual quantization, and further pushes forward the Pareto-optimal curve.

BRIEF DESCRIPTION OF THE DRAWINGS

FIG. 4 is pseudo code of the training algorithm.

DETAILED DESCRIPTION

LightNN Overview

As a quantized DNN model, LightNN constrain the weights of a network to be the sum of k powers of 2, denoted as LightNN-k. Thus, the multiplications between weights and activations can be implemented with k shift operations and k−1 additions. Specifically, LightNN-1 constrains the weights to be a power of 2, and only uses a shift for a multiplication. The approximation function used by LightNN-k to quantize a full-precision weight w can be formulated in a recursive way: $Q_k(w)=Q_{k-1}(w)+Q_1(w-Q_{k-1}(w))$ for k>1, where $Q_1(w)=\text{sign}(w) \times 2^{[log(|w|)]}$ which rounds the weight w to a nearest power of 2.

LightNN is trained with a modified backpropagation algorithm. In the forward phase of each training iteration, the parameters are first approximated using the $Q_k$ function. Then, in the backward phase, the gradients of loss with respect to quantized weights are computed and applied to the full-precision weights in the weight update phase.

LightNN has proven to be accurate and energy-efficient on customized hardware. LightNN-2 can generally have an accuracy close to full-precision DNNs, while LightNN-1 can achieve higher energy efficiency than LightNN-2. Due to the nature of the discrete k values, there exists a gap between LightNN-1 and LightNN-2 with respect to accuracy and energy.

The present invention customizes the k values for each convolutional filter, and thus, achieves a smoother energy-accuracy trade-off to provide hardware designers with more design options.

Differentiable Training

Herein, the quantization function is first defined, and then the end-to-end training algorithm for the present invention is introduced, equipped with a regularization loss to penalize large k values.

Figure 1:
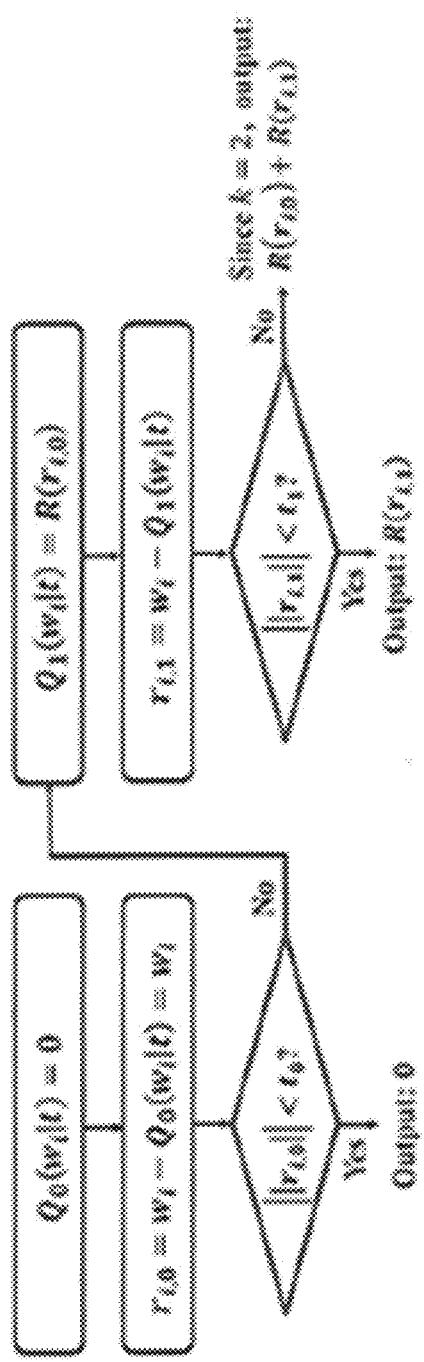
FIG. 1 is a flow chart showing the quantization flow for k=2.

Quantization function: The $i^{th}$ filter of the network is denoted as $w_i$ and the quantization function for the filter $w_i$ as $Q_k(w_i|t)$, where $k=\max_i k$ is the maximum number of shifts used for this network, and vector t is a latent variable that controls the approximation (e.g., some threshold value). Also, the residual resulting from the approximation is denoted as $r_{i,k}=w_i-Q_k(w_i|t)$. The quantization function is formally defined as follows:

$$Q_k(w_i|t) = \begin{cases} 0, & \text{if } k = 0 \\ \sum_{j=0}^{k-1} \mathbb{I}(\|r_{i,j}\|_2 > t_j) R(k_{i,j}), & \text{if } k \geq 1 \end{cases}$$

where $R(x)=\text{sign}(w) \times 2^{[log(|x|)]}$ rounds the input variable to a nearest power of 2, and [·] is a rounding-to-integer function. This quantization flow is shown in FIG. 1. To interpret the thresholds t, $t_0$ determines whether this filter is pruned out, and $t_1$ determines whether one shift is enough, etc. Then, the number of shifts for the $i^{th}$ filter is $k_i=\Sigma_{j=0}^{k-1} \mathbb{I}(\|r_{i,j}\|_2 > t_j)$. Therefore, choosing $k_i$ per filter is equivalent to finding optimal thresholds t.

Figure 2:
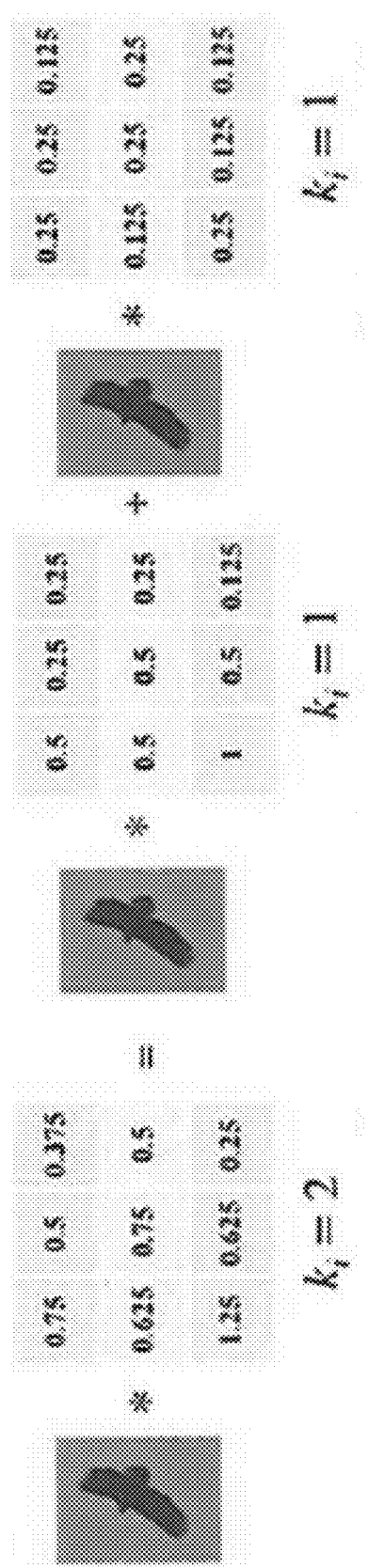
FIG. 2 shows an equivalent conversion from a convolution with a $k_t>1$ filter to $k_t$ convolutions, each with a $k_t=1$ filter.

The quantization approach of the present invention targets efficient hardware implementation. Instead of assigning a customized $k_i$ for each weight, the present invention has customized $k_i$ values per filter, and therefore preserves the structural sparsity. As shown in FIG. 2, the convolution with a $k_i=2$ filter can be equivalently converted to the sum of two convolutions each with a $k_i=1$ filter. Thus, the present invention can be efficiently implemented as LightNN-1 with an extra summation of feature maps per layer.

Differentiable Training: Instead of picking the thresholds t by hand, they are considered as trainable parameters. Therefore, the loss function $\mathcal{L}(w^2,t)$ is a function of both weights and thresholds. A straight-through estimator is used to compute $$\frac{\partial \mathcal{L}}{L w_i}.$$

By defining $$\frac{\partial w_i^q}{\partial w_i} = 1$$

where $w_i^q = Q_k(w_i|t)$ is the quantized $w_i$; we have $$\frac{\partial \mathcal{L}}{\partial w_i} = \frac{\partial \mathcal{L}}{\partial w_i^q}, \frac{\partial w_i^q}{\partial w_i} = \frac{\partial \mathcal{L}}{\partial w_i^q},$$

which becomes a differentiable expression.

To compute the gradient for thresholds, i.e., $$\frac{\partial w_i^q}{\partial t_j}$$

the indicator function $g(x, t_j) = \mathbb{I}(x > t_j)$ is relaxed to a sigmoid function, $\sigma(\cdot)$, when computing gradients, i.e., $\hat{g}(x,t_j)=\sigma(x-t_j)$. In addition, the straight through estimator is used to compute the gradient for R(x). Thus, the gradient $$\frac{\partial w_i^q}{\partial t_j}$$

can be computed by:

$$\frac{\partial Q_{k_i}(w_i|t)}{\partial t_j} = \sum_{l=0}^{k_i-1} \frac{\partial \sigma(\|r_{i,l}\|_2 - t_l)}{\partial t_j} R(r_{i,l}) + \sigma(\|r_{i,l}\|_2 - t_l) \frac{\partial R(r_{i,l})}{\partial t_j} =$$

$$\sum_{l=0}^{k_i-1} \sigma'(\|r_{i,l}\|_2 - t_l)\left(\frac{\partial \|r_{i,l}\|_2}{\partial t_j} - \frac{\partial t_l}{\partial t_j}\right) R(r_{i,l}) + \sigma(\|r_{i,l}\|_2 - t_l) \frac{\partial r_{i,l}}{\partial t_j}$$

where $$\frac{\partial \|r_{i,l}\|_2}{\partial t_j} \text{ and } \frac{\partial r_{i,l}}{\partial t_j}$$

are 0 for l<j; otherwise, they can be computed with the result of $$\frac{\partial Q_l\{w_l|t\}}{\partial t_j} \cdot \frac{\partial t_l}{\partial t_j} = \mathbb{I}\,(l=j).$$

Figure 3:
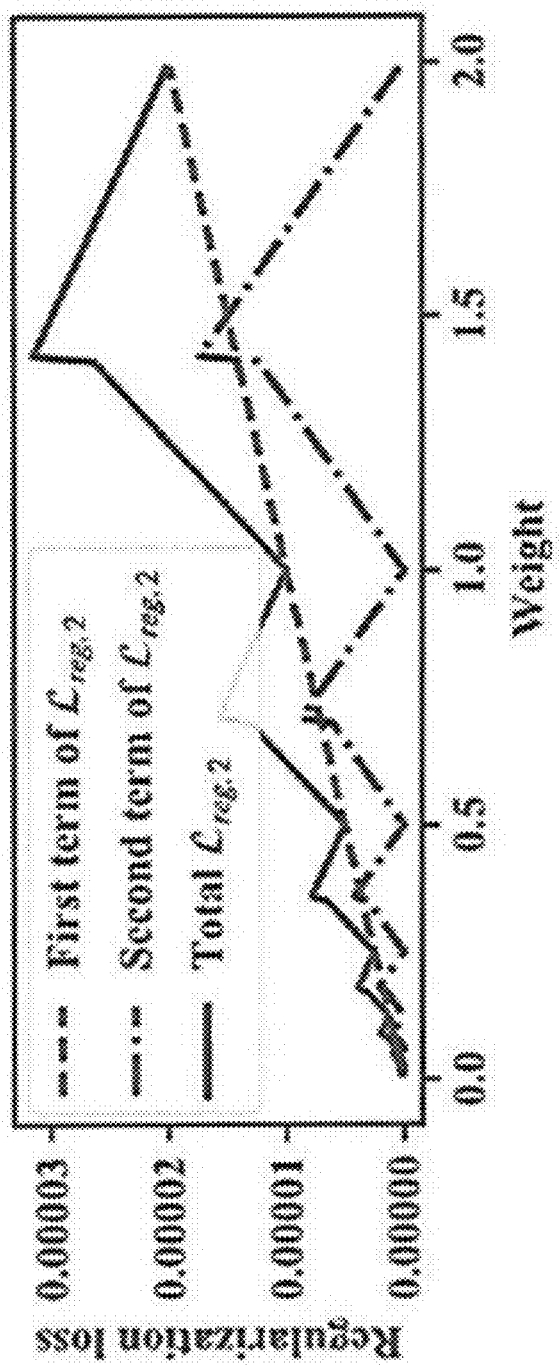
FIG. 3 is a graph showing the regularization loss curve with respect to weight value.

Regularization: To encourage smaller $k_i$ for the filters, a regularization loss: $\mathcal{L}_{reg,k}(w) = \Sigma_{j=0}^{k-1} \lambda_j \Sigma_i \|r_{i,k}\|_2$ was added, where $\lambda_j$ performs as a handle to balance accuracy and model sparsity. This regularization loss is the sum of several group Lasso losses, since they can introduce structural sparsity. The first item $\lambda_0 \Sigma_i \|r_{i,0}\|_2 = \lambda_0 \Sigma_i \|w_i\|_2$ is used to prune the whole filters out, while the other items (j>0) regularize the residuals. FIG. 3 shows the two items of regularization loss and their sum for the case k=2 with $\lambda_0 = 1e^{-5}$ and $\lambda_1 = 3e^{-5}$. Therefore, the total loss for training is: $\mathcal{L}_{total}(w,t) = \mathcal{L}_{CE}(w,t) + \mathcal{L}_{reg,k}(w)$.

The new training algorithm is summarized in FIG. 4. This is the same as the conventional backpropagation algorithm for full precision DNNs, except that in the forward phase, the weights are quantized given the thresholds t. Then, due to the differentiability of the quantization function with respect to w and t, their gradients can be computed and their values updated in each training iteration.

The present invention, disclosed herein, customizes the number of shift operations for each filter of a LightNN. Equipped with the differentiable training algorithm, the present invention can achieve a flexible trade-off between accuracy and speed/energy. The present invention provides a more continuous Pareto front for LightNN models and outperforms fixed-point DNNs with respect to both accuracy and speed/energy. Moreover, due to the gradual quantization nature of the differentiable training, the present invention achieves higher accuracy than LightNN-1 without sacrificing speed and energy efficiency, and thus, pushes forward the Pareto-optimal front.

We claim:

1. A method of training a deep neural network having multiple convolutional layers, each convolutional layer having one or more filters, comprising, for some or all of the one or more filters:
   quantizing weights for some or all of the one or more filters as a set of numbers;
   computing a residual for some or all of the one or more filters based on a difference between unquantized weights of the one or more filters and the quantized weights;
   determining a parameter k for some or all of the one or more filters based on a comparison of the computed residual to a threshold;
   computing a loss function for the unquantized weights and the threshold; and
   updating the unquantized weights for some or all of the one or more filters based on a derivative of the computed loss function by applying a number of operations based on k for each weight.

2. The method of claim 1, each number in the set of numbers comprising a sum of powers of 2.

3. The method of claim 1, the number of operations comprising k shift operations and a k−1 add operations.

4. The method of claim 1, the optimal threshold being updated based on a derivative of the computed loss function.

5. The method of claim 1, the loss function being a sum of a cross entity loss and a regularization loss.

6. The method of claim 5, the regularization loss being a sum of a plurality of lasso losses.

7. The method of claim 1 wherein a maximum value for k is pre-selected.

8. The method of claim 1, the weights being quantized in accordance with the function:

$$Q_k(w_i|t) = \begin{cases} 0, & \text{if } K = 0 \\ \sum_{j=0}^{K-1} \mathbb{I}\,(\|r_{i,j}\|_2 > t_j)\, R(k_{i,j}), & \text{if } K \geq 1 \end{cases}$$

where:
K is a maximum value for k;
$r_{i,j}$ is a residual defined as $w_i - Q_k(w_i|t)$;
$R(x) = \text{sign}(w) \times 2^{[log(|x|)]}$; and
[·] is a rounding to integer function.

9. The method of claim 8, the parameter k for filter i defined as $$k_i = \sum_{j=0}^{k-1} \mathbb{I}\,(\|r_{i,j}\|_2 > t_j).$$

10. A system of training a deep neural network having multiple convolutional layers, each convolutional layer having one or more filters, comprising, for some or all of the one or more filters:
   a processor; and
   memory coupled to the processor and containing software that, when executed by the processor performs, for some or all of the one or more filters, the functions of:
   quantizing weights for some or all of the one or more filters, as a set of numbers;
   computing a residual for some or all of the one or more filters, based on a difference between the unquantized weights and the quantized weights;
   determining a parameter k for some or all of the one or more filters, based on a comparison of the computed residual to an optimal threshold;
   computing a loss function for the weights and the optimal threshold; and
   updating the weights for some or all of the one or more filters, based on a derivative of the computed loss function by applying a number of operations based on k for each weight.

11. The system of claim 10, each number in the set of numbers comprising a sum of powers of 2.

12. The system of claim 10, the number of operations comprising k shift operations and a k−1 add operations.

13. The system of claim 10, the optimal threshold being updated based on a derivative of the computed loss function.

14. The system of claim 10, the loss function being a sum of a cross entity loss and a regularization loss.

15. The system of claim 14, the regularization loss being a sum of a plurality of lasso losses.

16. The system of claim 10 wherein a maximum value for k is pre-selected.

17. The system of claim 10, the weights being quantized in accordance with the function:

$$Q_k(w_i|t) = \begin{cases} 0, & \text{if } K = 0 \\ \sum_{j=0}^{K-1} \mathbb{I}(\|r_{i,j}\|_2 > t_j) R(k_{i,j}), & \text{if } K \geq 1 \end{cases}$$

where:

K is a maximum value fork;

$r_{i,j}$ is a residual defined as $w_i - Q_k(w_i|t)$;

$R(x) = \text{sign}(w) \times 2^{[log(|x|)]}$; and $[\cdot]$ is a rounding to integer function.

18. The system of claim 17, the parameter k for filter i defined as $$k_i = \sum_{j=0}^{k-1} \mathbb{1}(\|r_{i,j}\|_2 > t_j).$$

* * * * *